Patented Aug. 5, 1924.

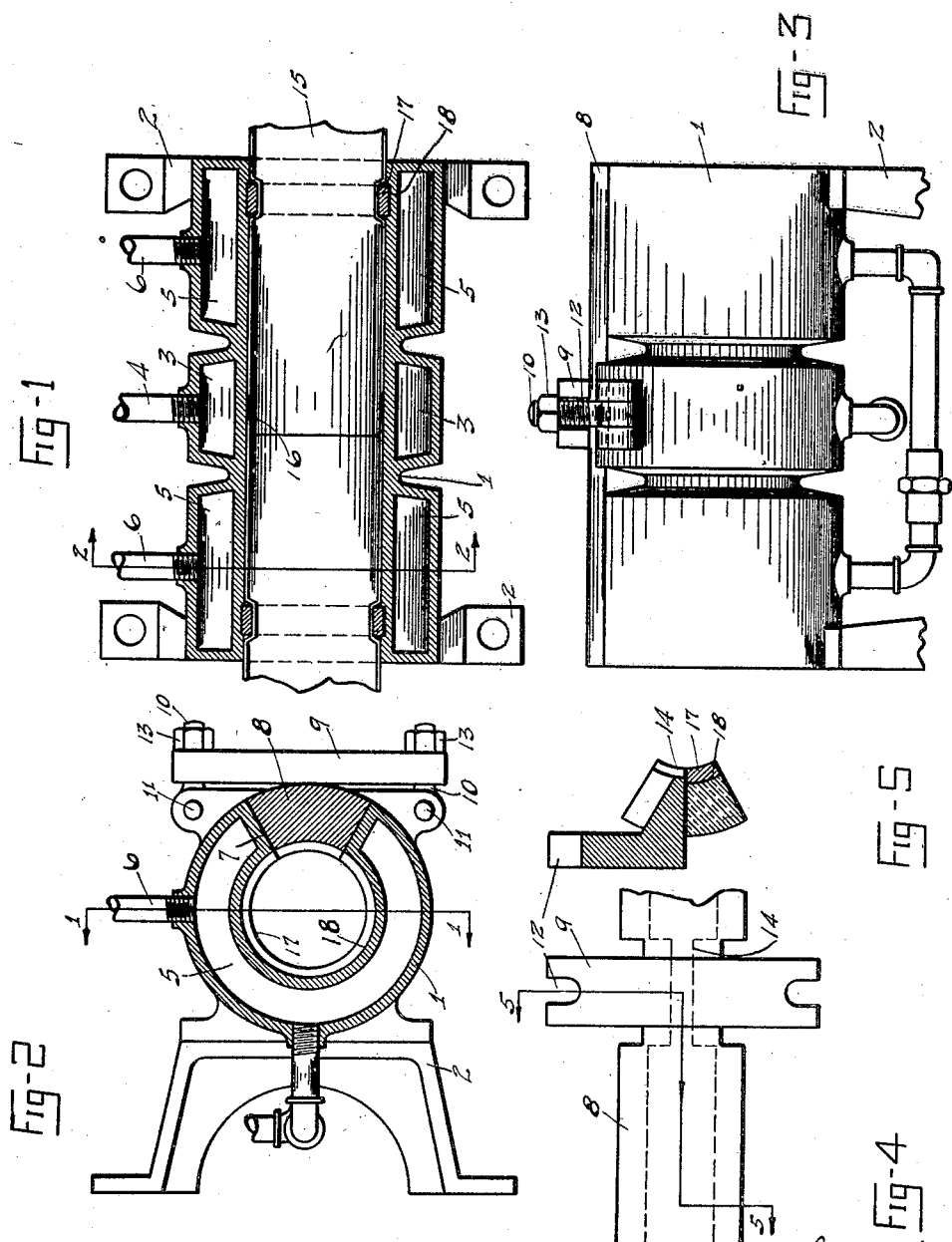

1,503,798

UNITED STATES PATENT OFFICE.

JOSEPH G. MOOMY, OF ERIE, PENNSYLVANIA, ASSIGNOR TO MARY H. MOOMY, OF ERIE, PENNSYLVANIA.

TUBE-VULCANIZING DEVICE.

Application filed March 17, 1922. Serial No. 544,627.

*To all whom it may concern:*

Be it known that I, JOSEPH G. MOOMY, a citizen of the United States, residing at Erie, in the county of Erie and State of Pennsylvania, have invented new and useful Improvements in Tube-Vulcanizing Devices, of which the following is a specification.

The apparatus is designed to vulcanize the ends of a tube in order to close an annular tube such as used for automobiles. Heretofore such joint has been formed by vulcanization with what is known as "cold cure" and in some instances heat has been used by folding the tube. Where this is done portions of the tube subjected to the second heat are weakened so that there is a tendency for the tube to bulge adjacent to the joint and the tube is otherwise deformed. With the present invention the overlapped portions are vulcanized in alinement and there is no fold in the tube and consequently no deforming of it and the portions of the tube adjacent to the joint are cooled so that the rubber away from the joint is not weakened. The invention in this application, however, is particularly directed to a means for conveniently resisting the longitudinal extension of the tube as it is being vulcanized.

The invention is illustrated in the accompanying drawings as follows:—

Fig. 1 shows a section on the line 1—1 in Fig. 2.

Fig. 2 a section on the line 2—2 in Fig. 1.

Fig. 3 a side elevation.

Fig. 4 a plan view of the cover.

Fig. 5 a section on the line 5—5 in Fig. 4.

1 marks the cylinder, 2 the base, and 3 a steam jacket adapted to heat a zone around the mold of sufficient width to cover the joint. The steam jacket is supplied with steam by a pipe 4. Water jackets 5 are arranged around the mold adjacent to the steam jacket and the cool zones adjacent to the zones heated by the steam jacket. These are supplied with water or a cooling medium through the pipes 6. An opening 7 extends longitudinally across the mold permitting the removal of the joined tube. A cover 8 is provided for the opening 7. It is provided with a cross bar 9, the cross bar being secured by eye bolts 10 secured on pins 11, the pins 11 being secured to the mold. The bolts 10 extend through slots 12 in the cross bar 9 and nuts 13 are provided for clamping the cross bar and thus clamping the cover in place. The cover is preferably narrower through the steam zone as 14 than the outer portion so that the tube may be more conveniently removed.

A tube is shown at 15 and the joint is indicated at 16. In operation the ends of the tube are joined with a vulcanizing cement and drawn into place in the mold. The mold is properly heated and fluid pressure, preferably air, is pumped into the tube. There is enough adhesion of the vulcanizing cement to hold the parts together as against leakage and consequently the overlapping is subjected to pressure so as to form a firm joint.

In order to resist the longitudinal extension of the tube as it is put under pressure I provide friction surfaces along the wall of the mold which engage the walls of the cooled portion of the tube and thus prevent its extension. This is preferably accomplished by rubber rings 17 which are arranged in annular grooves 18 in the mold. Preferably the ring projects slightly into the mold so as to better engage the tube.

What I claim as new is:—

1. In a tube vulcanizing device, the combination of a mold; and means engaging the tube and resisting its longitudinal expansion comprising friction surfaces of greater frictional resistance than the mold.

2. In a tube vulcanizing device, the combination of a mold; and means engaging the tube and resisting its longitudinal expansion comprising rubber friction surfaces in the walls of the mold engaging the tube.

3. In a tube vulcanizing device, the combination of a mold having circumferential grooves therein; and rubber arranged in said grooves and adapted to engage an inserted rubber tube to prevent its lateral extension.

4. In a tube vulcanizing device, the combination of a mold; and means resisting longitudinal extension of the tube in the mold comprising friction surfaces of greater frictional resistance than the mold, said friction surfaces extending around and projecting slightly into the mold.

5. In a tube vulcanizing device, the combination of a mold; means resisting longitudinal expansion of the tube in the mold comprising engaging surfaces extending around and in the walls of the mold, said engaging surfaces comprising shoulders against which the tube is expanded.

In testimony whereof I have hereunto set my hand.

JOSEPH G. MOOMY.